United States Patent [19]

Sarcander

[11] Patent Number: 4,556,527
[45] Date of Patent: Dec. 3, 1985

[54] METHOD AND APPARATUS FOR MAKING PLASTICS-COATED SANITARY WEBS OF PAPER

[75] Inventor: Uwe Sarcander, Lengerich, Fed. Rep. of Germany

[73] Assignee: Windmoller & Holscher, Lengerich, Fed. Rep. of Germany

[21] Appl. No.: 536,983

[22] Filed: Sep. 29, 1983

[30] Foreign Application Priority Data

Oct. 1, 1982 [DE] Fed. Rep. of Germany ....... 3236459

[51] Int. Cl.[4] .............................................. B29D 7/22
[52] U.S. Cl. .................................. 264/171; 264/284; 425/113; 425/385
[58] Field of Search ............... 264/171, 174, 136, 284; 425/385, 367, 113

[56] References Cited

U.S. PATENT DOCUMENTS

| 2,106,246 | 1/1938 | Fourness | 264/284 |
| 2,609,568 | 9/1952 | Getchell | 425/385 |
| 3,130,412 | 4/1964 | Fox et al. | 425/385 |
| 3,175,026 | 3/1965 | James | 264/284 |
| 3,206,346 | 9/1965 | Nuorivaara | 264/284 |
| 3,471,354 | 10/1969 | Scofield | 264/284 |
| 3,484,835 | 12/1969 | Trounstine et al. | 264/284 |
| 3,810,729 | 5/1974 | Patchell | 264/284 |
| 4,211,743 | 7/1980 | Nauta et al. | 264/284 |
| 4,233,011 | 11/1980 | Bolender et al. | 425/367 |
| 4,280,978 | 7/1981 | Dannheim et al. | 264/284 |

FOREIGN PATENT DOCUMENTS 1761403 7/1971 Fed. Rep. of Germany .

*Primary Examiner*—Jeffery Thurlow
*Attorney, Agent, or Firm*—Fleit, Jacobson, Cohn & Price

[57] ABSTRACT

In the production of plastics-coated sanitary webs of paper having an embossed rectangular or rhombic pattern, a plastics layer is extruded onto one side of the paper and pressed thereto by a cooled embossing tool while the paper is elastically supported.

3 Claims, 2 Drawing Figures

METHOD AND APPARATUS FOR MAKING PLASTICS-COATED SANITARY WEBS OF PAPER

The invention relates to a method of making plastics-coated sanitary webs of paper with a rectangular or rhombic embossed pattern, and to an apparatus for performing this method.

Sanitary papers, that is to say fleece-like paper or wadding, which are soft, voluminous and absorbent are generally used as disposable supports in hospitals, medical practices and in households having children. They are also suitable as paper towels or the like. If the sanitary papers are used for hygienic purposes, their wet strength is of particular importance. To increase the wet strength of so-called hygienic papers, it is known to provide fleece-like or sanitary papers with a one-sided sealing layer. To produce such hygienic papers, it is known to unwind a thin web of plastics film from a first roller and a web of paper wadding from a second roller and bring the two webs together. The superposed webs are, for the purpose of joining same, fed through a pair of rollers after plasticizing the web of film by heating, one of the rollers being in the form of a backing roller and the other in the form of an embossing roller with, for example, rhombic surface relief. In hygienic papers made by this method, the web of paper wadding, which serves as a carrier web, is joined to the web of film by the relief-like projections on the surface of the embossing roller, but only along a grid corresponding to the pattern of the relief instead of the entire surface. The relief-like structure is formed on the film as well as on the web of paper wadding and gives the hygienic paper an easily grippable surface. Whenever hygienic paper made by this method becomes moist, the web of paper wadding separates from the web of film on the occurrence of only little friction because the webs are interconnected only along the lines of the grid-like relief.

Apart from incomplete joining of the two webs of the hygienic paper made by the known method, this method is comparatively expensive and cumbersome because the plastics film first has to be made in a separate operation and wound to a reel and later unwound and heated for the purpose of joining it to the web of paper wadding. Another disadvantage of the known method arises out of a high embossing pressure required for the embossing tool, whereby the embossing roller and backing roller are subjected to high stresses.

It is the problem of the invention to suggest a method by which it is possible to make in a simple manner hygienic papers which have a relieve-like pattern and of which the web of paper wadding is surface-connected to the web of film that coats one side thereof.

According to the invention, this problem is solved in that a plastics layer is extruded onto one side of a sanitary web of paper and pressed to the elastically supported sanitary web of paper by a cooled embossing tool for the purpose of joining thereto. According to the method of the invention, the plastics film which has just been extruded and is still in a soft condition is pressed directly by the cooled embossing tool against the web of paper wadding from the side of the extruded-on plastics layer, so that, despite the relief-like surface of the embossing tool, a relatively low pressure will bring about a surface adhesive connection of the two webs.

DE-OS No. 17 61 403 discloses a method and apparatus for making packaging paper consisting of a carrier web of paper connected in a grid to a web of film laminated thereto. The apparatus for making such plastics-laminated packaging papers consist of an embossing roller and a backing roller between which the web of paper to be coated passes in S formation, a wide slot nozzle being provided from which a plastics film is extruded into the nip between the embossing and backing rollers. In the known apparatus, the backing roller is provided with a smooth water-cooled surface of hard chrome whilst the embossing roller has a rubber surface with a grid-like embossed pattern. In the known apparatus, the web of packaging paper first runs onto the rubber surface of the embossing roller so that the fluent plastics film is extruded into the nip between the paper web and the chrome-plated backing roller and the embossing pressure is exerted onto the paper web by the rubber roller. Since the grid-like relief formed by rubber ridges on the embossing roller flattens out under the embossing pressure and the embossing pressure is exerted on the relatively stiff web of packaging paper, no marked grid-like joining pattern is formed and the connection between the web of packaging paper and the web of film occurs only in the region of the relief-like projections on the rubberroller rather than over the entire surface.

Based on the apparatus known from DE-OS No. 17 61 403, the apparatus of the invention is characterised in that the backing roller has a smooth cylindrical surface of elastic material and the steel or like surface of the embossing roller is cooled, that means are provided for substantially horizontally feeding the sanitary web of paper to the backing roller, and that the surface of the embossing roller is provided with two intersecting groups of parallel strip-like projections of which the height corresponds to the thickness of the sanitary web of paper plus the thickness of the extruded plastics film. By means of the apparatus of the invention, one can achieve a well defined grid-like embossed pattern and a full-surface connection between the extruded plastics film and the web of paper wadding because the height of the projections forming the relief on the embossing roller is so adapted to the thickness of the webs that are to be interconnected that a pressure which is adequate for adhesion will also result in the depressions of the relief pattern that is to be embossed.

One example of the invention will now be described in more detail with reference to the drawing, wherein.

Figure 1:
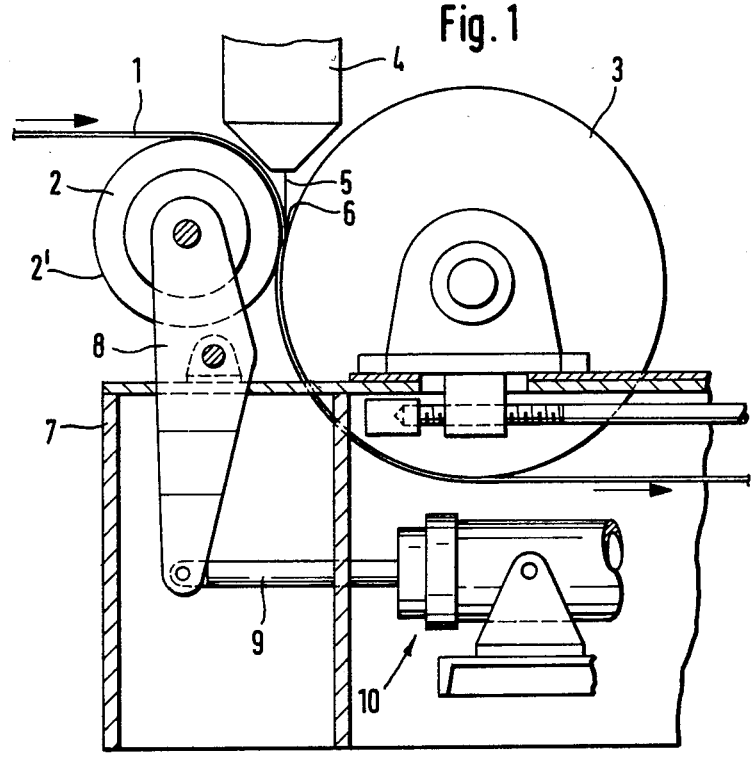
FIG. 1 is a diagrammatic side elevation of a coating apparatus.

A web 1 of paper wadding unwound from a supply reel (not shown) is fed by way of supply means (not shown) to the backing roller 2 which is provided with a smooth rubber cover 2'. The backing roller 2 is mounted in the machine frame 7 at the respective one end of double-armed levers 8 to the other ends of which there is hinged the piston rod 9 of a piston-cylinder unit 10 mounted in the frame. By means of the piston-cylinder unit 10, the pressure roller 2 can be pressed against the embossing roller 3 which is provided with a cooled surface and is mounted in the machine frame 7. Above the nip 6 of the backing and embossing rollers 2, 3 there is a wide slot extruder nozzle 4 out of which a thin fluent polyethylene film can be extruded into the nip 6.

Figure 2:
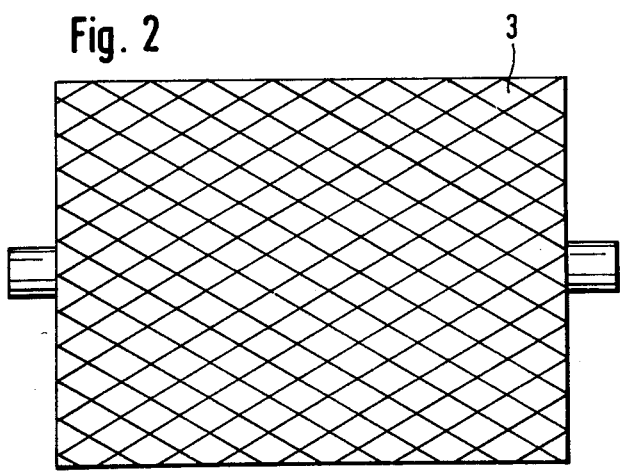
FIG. 2 is a front elevation of the cooled embossing roller.

As shown in FIG. 2, the embossing roller 3 is provided with a rhombic embossed pattern which projects in relieve above the surface of the rollers.

The web 1 of paper wadding is slung in substantially S formation about the backing and embossing rollers 2, 3 as shown.

To make hygienic papers, a still fluent plastics film is extruded from the wide slot extruder nozzle 4 onto the web 1 of paper wadding in the roller nip 6. This film is cooled immediately by the embossing roller 3 and pressed against the web 1 of paper wadding while creating a defined relief-like pattern. The height of the relief-like embossed pattern of the cooling roller 3 substantially corresponds to the thickness of the paper wadding 1 plus the thickness of the extruded plastics film 5 so that the surface of the cooling roller 3 forming the base of the relief still presses the plastics film 5 with adequate pressure against the web of paper wadding that is supported on the backing roller 2, so that the webs adhere to each other over their full surface.

I claim:

1. Apparatus for making plastics-coated sanitary webs of paper, said apparatus comprising:
    a roller frame;
    embossing roller means including a cooled, hard surface defining a relief pattern;
    backing roller means including a smooth cylindrical surface of elastic material, said embossing roller means and said backing roller means being mounted on said roller frame pressing against one another with an embossing pressure and defining a nip therebetween;
    means for feeding a paper web onto said backing roller means and through said nip for elastically supporting said paper web;
    nozzle means mounted above said nip for extruding a plastics film onto a surface of said paper web opposite to a surface of said paper web elastically supported on said backing roller means; and
    a height of said relief pattern of the embossing roller means substantially corresponding to a thickness of the paper web plus a thickness of the extruded plastics film, a surface of the embossing roller forming a base of the relief pattern presses the plastics film with said embossing pressure against the paper web that is supported on the backing roller means and the paper web and the extruded plastics film adhere to each other over their full surface.

2. Apparatus for making plastics-coated sanitary webs of paper as in claim 1, wherein said relief patter includes two intersecting groups of parallel strip projections.

3. A method of making sanitary webs of hygienic paper from a web of paper and an extruded plastics film using an embossing roller including a cooled steel or like surface defining a relief pattern and a backing roller including a smooth cylindrical surface of elastic material, said embossing roller and said backing roller defining a nip therebetween, said method comprising;
    feeding a length of said paper web onto said backing roller;
    extruding a plastics film onto a surface of said paper web opposite to a surface contacting said backing roller;
    feeding said paper web and said extruded plastics film to said nip;
    pressing said extruded plastics film by said embossing roller against said paper web in said nip;
    embossing said relief pattern onto said extruded plastics film; and
    adhering a full surface of said paper web to a full surface of said extruded plastics film by said embossing.

* * * * *